Dec. 10, 1968    W. E. VOISINET    3,415,674
IMPREGNATION OF ASBESTOS-CEMENT PRODUCTS WITH
THERMOSETTING FORMALDEHYDE RESIN
Filed April 19, 1965

INVENTOR.
Walter E. Voisinet
BY
ATTORNEY

United States Patent Office 3,415,674
Patented Dec. 10, 1968

3,415,674
IMPREGNATION OF ASBESTOS-CEMENT PRODUCTS WITH THERMOSETTING FORMALDEHYDE RESIN
Walter E. Voisinet, Colden, N.Y., assignor to National Gypsum Company, Buffalo, N.Y., a corporation of Delaware
Filed Apr. 19, 1965, Ser. No. 449,038
15 Claims. (Cl. 117—72)

ABSTRACT OF THE DISCLOSURE

A surface treatment of asbestos-cement products including application and impregnation of an aqueous solution of a thermosetting formaldehyde resin, curing the impregnated resin, stabilizing a surface layer of the product without destroying the porosity, and applying thereover a finish decorative coating which is of improved permanence due to the stability and the porosity of the product surface layer.

The present invention relates to a process for treating asbestos-cement and similar products in order to increase the adhesion of finish coatings to the surface of such products. More particularly, it relates to a process for impregnating asbestos-cement and similar products, such as lime-silica board, with a resin prior to applying a finish coating in order to provide improved lasting adhesion and durability of the finish coating.

Asbestos-cement products possess characteristics which make them desirable as building material, for such products are incombustible, durable, and corrosion resistant. Accordingly, asbestos-cement products are commonly used on exterior surfaces of buildings in the form of shingles, siding, clapboards, and the like. In recent years, it has been desired, for economic and aesthetic reasons, to provide such asbestos-cement products with a decorative finish coating. In the past, however, it has been extremely difficult to provide a durable, weather-resistant, decorative coating on asbestos-cement products, for the coatings tended to fail by chipping or flaking off after only short periods of exposure to weathering conditions. This failure of the decorative coating is due primarily to mechanical movement of the asbestos-cement substrate resulting from repeated wetting and drying of the sheets. Thus, when the sheets are wetted, either by liquid water, such as rain, or by water vapor in the air, the asbestos-cement substrate is softened and swells. Upon drying, the substrate shrinks. This repeated expansion and contraction of the asbestos-cement disrupts and weakens the bonding of the decorative coating to the substrate so that the coating has poor adhesion and, consequently, poor durability.

The lack of durability and adhesion of the decorative coating is also due to another factor which is chemical in nature. Metallic oxides, present in the cement, remain in the cement after manufacture. These metallic oxides combine with water absorbed by the asbestos-cement to form basic compounds which migrate to the surface of the sheet and attack the coating material, especially at the interface, thereby weakening or destroying the bond.

Heretofore, attempts to provide a durable, weather-resistant coating on asbestos-cement substrates have been directed primarily to seeking a coating material itself which would withstand the deleterious effects of wind and weather, as well as overcome the coating problems peculiar to asbestos-cement substrates. The present invention, however, is directed to treating the substrate to eliminate these problems at the source rather than attempting to overcome them by altering only the coating itself.

It is therefore an object of the present invention to provide a process for treating asbestos-cement and similar products to increase the durability of finish coatings applied thereto.

Another object is to provide a process for manufacturing durable, weather-resistant asbestos-cement products having a decorative finish coating.

Another object is to provide a process for modifying the surface and sub-surface areas of asbestos-cement products to improve the integrity of the asbestos-cement substrate.

Another object of the invention is to provide a process for treating asbestos-cement products in order to render the substrate more cohesive and prevent mechanical movement of the asbestos-cement particles when the products are exposed to weathering conditions.

A further object is to provide improved asbestos-cement and similar products which are suitable for prolonged exterior use and characterized by a relatively permanent protective and decorative coating.

These and other objects and advantages will become apparent from the following description and drawings of an embodiment of the invention.

Figure 1:
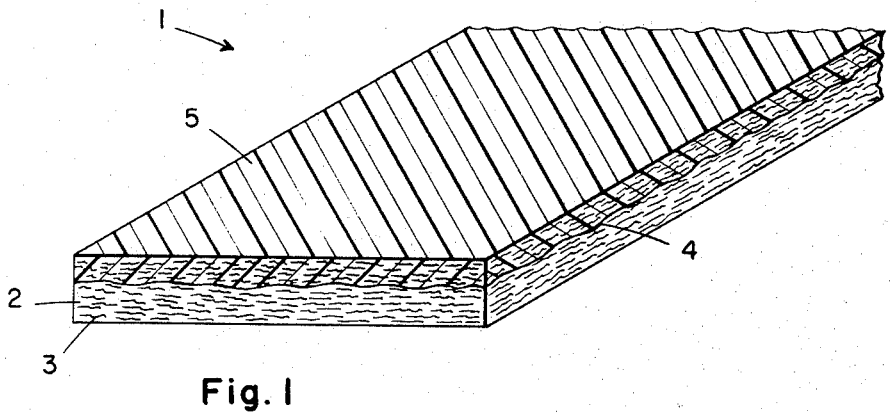
FIGURE 1 is a perspective view of a portion of an asbestos-cement product, such as a board, a sheet, etc., treated according to the process of the present invention, prior to the application of a finish decorative coating.

These and other objects of the invention are attained by the present invention which provides a process in which a durable, weather-resistant finish coating can be applied to an asbestos-cement product without danger of the coating chipping or flaking off, even after prolonged exposure to weathering conditions. According to the present invention, asbestos-cement products, such as sheets, boards, and the like, are impregnated with a water-dilutable, thermosetting formaldehyde resin by applying to a surface of the product an aqueous solution of the formaldehyde resin, and the impregnated asbestos-cement products then heated to cure the resin. Thus, the uncured, diluted formaldehyde resin applied to the surface of the asbesto-cement sheet penetrates the surface of the sheet and impregnates the subsurface area of the asbestos-cement substrate. Upon heating, the resin is cured in situ to provide an integral resin-asbestos-cement layer extending from the surface of the sheet into the interior thereof. This layer, when cured, binds together the surface and subsurface asbestos-cement particles and renders the substrate more cohesive, thereby minimizing mechanical movement of the particles when the board is exposed to water or water vapors. Thus, the presence of the resin layer in the asbestos-cement sheet serves to bind the asbestos-cement particles firmly in place, thereby minimizing expansion and contraction of the asbestos-cement substrate due to repeated wetting and drying of the substrate. As a result, since the finish coatings are no longer subjected to this mechanical movement of the substrate, the coatings are much more durable and weather-resistant. In addition to this bonding effect, the resin layer within the asbestos-cement board serves as a barrier to inhibit movement of the hydrated metal oxides present in the cement to the surface of the board, thereby preventing such oxides from attacking the coating material and weakening the coating bond. In other words, impregnating the asbestos-cement product with the diluted formaldehyde resin and then curing the resin renders the substrate itself more cohesive and prevents mechanical movement of the particles which serves to loosen the surface and disrupt the coating bond, while at the same time sealing the surface and near surface areas against passage of water and/or water-borne oxides.

Resins which can be used in the process of the present invention are thermosetting formaldehyde resins which are water-dilutable and which, when diluted with water, will penetrate into the asbestos-cement substrate and can be cured in situ by heating the impregnated asbestos-cement sheet. Such formaldehyde resins are phenol-formaldehyde, urea-formaldehyde, resorcinol-formaldehyde and melamine-formaldehyde resins. Each of these resin systems, at the proper stage of cure to be still soluble in alcohol and water dilutable, when diluted with water, will penetrate into the asbestos-cement substrate and can be further cured in situ to form an integral resin layer extending from the surface of the sheet into the interior thereof. Generally, it is preferred to use phenol-formaldehyde resins. A suitable phenol-formaldehyde resin is one obtained from Durez Plastics Division of Hooker Chemical Corporation under the designation "Durez 17670." This resin is a B-stage liquid phenol-formaldehyde condensation product having a pH of 8.5 to 8.9, a specific gravity of from 1.1 to 1.2, a solids content of from 54% to 58%, a water tolerance of 200%, and a relatively fast cure. It is obtained by mixing phenol and formaldehyde in the mole ratio of 1 to 1.5 with a suitable basic catalyst and heating the mixture for several hours, followed by layer separation and water removal. It is to be understood, however, that this phenolic resin is merely one suitable resin which may be used in the process of the present invention and that the invention is in no way limited to the use of this resin alone.

The resin, selected from the above-identified group, is taken in a low state of condensation so that it can be cured in situ after it has been impregnated into the asbestos-cement sheet. Preferably, an alcohol solution of the resin is first formed and this alcohol solution then diluted with water. The water-diluted alcohol solution of resin has a relatively low surface tension and readily wets the surface of the asbestos-cement sheet to facilitate absorption of the resin into the sheet. However, satisfactory results can be obtained merely by diluting the resin with water, such resin usually already in part alcohol solution.

It is necessary to dilute the formaldehyde resin sufficiently with water so that when applied to the asbestos-cement substrate, as by spraying, flooding, mopping, and the like, the resin penetrates the surface of the asbestos-cement sheet and impregnates the subsurface areas of the substrate. Furthermore, the water-diluted resin should be of a sufficiently low concentration to penetrate into the substrate rather than form a resin coating over the surface of the asbestos-cement product. In this way, the product retains surface porosity. Consequently, the resin, when cured, renders the asbestos-cement substrate more cohesive by binding together the surface and subsurface particles, without destroying the surface porosity which is advantageous for mechanical keying or drying of a finish coating.

The formaldehyde resin may be diluted with water in amounts ranging from one part water to two parts resin up to two parts water to one part resin. A one to one dilution of the resin with water has been found to be very satisfactory.

The amount of resin used to impregnate the sheet is, of course, dependent on the dilution of the resin and the density of the sheet. When the diluted resin is applied to the surface of the asbestos-cement sheet, the resin penetrates into the sheet and added resin builds up near the surface until the surface and subsurface areas are impregnated with the resin. The only quantitative requirement is that sufficient resin be used to bind the asbestos-cement particles in the surfaces and subsurface areas to prevent mechanical movement of the particles in the area, while the amount of resin used is not enough to form a coating over the surface of the board, so that surface porosity is retained. Generally, these requirements are met when the diluted resin is applied in an amount sufficient to provide from about 5 to 15 grams of dry resin per square foot of the asbestos-cement board.

The resin is then cured in situ by heating the impregnated sheet at a temperature of between about 200° F. to about 400° F. for a period of time of from about 30 minutes to about one hour. If the asbestos-cement product is formed by a process in which the asbestos-cement is cured by autoclaving in a saturated atmosphere of high pressure steam to steam-cure the asbestos-cement, the resin may also be cured in this step, with no additional heat treatment being required. If the asbestos-cement product is cured by storing the product at room temperature for about 30 days, a separate heat treatment of the impregnated sheet to cure the resin is, of course, required.

An asbestos-cement product treated in this manner has greatly improved integrity which is apparent from quantitative tests, such as scoring the sheet in a crosshatch pattern with a sharp knife to a depth of about $\frac{1}{16}$ inch. When subjected to such a test, the surface of a conventional asbestos-cement sheet will crumble. However, the surface of an asbestos-cement sheet produced according to the process of the present invention, when tested in the same manner, does not crumble but retains its integrity substantially completely.

After the resin has been cured, any conventional finish coating can be applied to the impregnated surface of the sheet. Thus, coatings such as latex paint, vinyl or acrylic enamel, and the like may be applied and heated to cure or coalesce the coating into a decorative film integrally bonded to the surface of the impregnated asbestos-cement sheet. Since mechanical movement of the asbestos-cement particles at the surface of the board is prevented, due to the cured resin layer, the finish coating has greater adhesion to the substrate when exposed to weathering conditions. As a result, the finish coating is more durable and weather-resistant.

Figure 2:
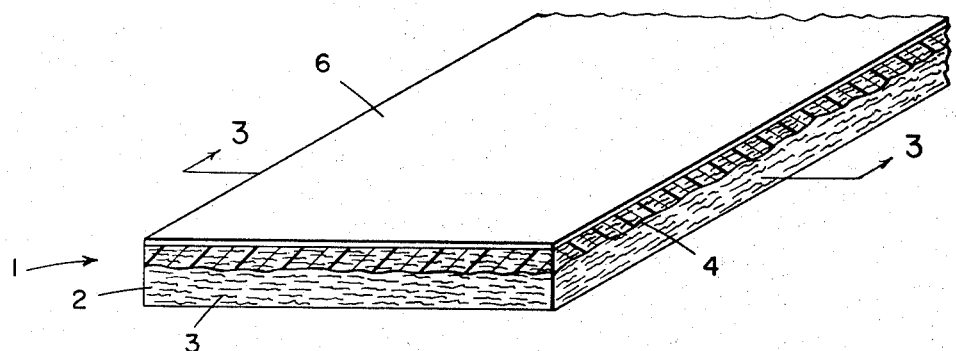
FIGURE 2 is a perspective view of a portion of an asbestos-cement product produced according to the present invention, after the application of a finish coating.
Figure 3:
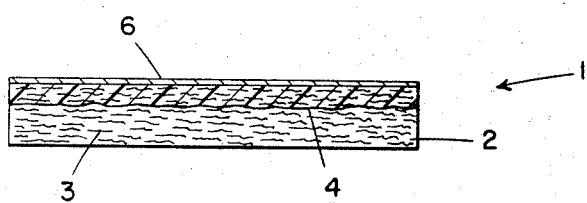
FIGURE 3 is a cross-sectional view of an asbestos-cement product taken through section line 3—3 in FIGURE 3.

Referring now more particularly to the drawings, numeral 1 generally designates an asbestos-cement product, such as a sheet, a board, or the like, the product comprising a cementing material 2, such as Portland cement, having asbestos fibers 3 uniformly distributed throughout the cement. A resin 4 impregnates the surface 5 and the subsurface areas of the sheet which are to be exposed to weathering conditions. In the embodiment shown in FIGURE 1, the impregnating material extends into the board for a distance of about ⅓ of the thickness of the board. As noted hereinabove, the resin may penetrate into the board to a greater or lesser degree, the only requirement being that the resin penetrate a distance sufficient to bind the particles in the surface and subsurface areas without forming a resin coating over the surface of the board. A conventional finish coating 6 is applied to the surface 5 of board 1, as illustrated in FIGURES 2 and 3. This finish coating is integrally bonded to the asbestos-cement substrate and provides a durable, decorative, weather-resistant product.

The asbestos-cement board itself may be formed in any conventional manner, including both the wet (Hatschek) process or the dry (Norton) process and can be cured either by normal curing or by steam curing.

The following preferred embodiment is illustrative of the present invention, but is not intended to limit the invention to the materials, proportions or conditions set forth therein.

An asbestos-cement sheet is prepared by the wet (Hatschek) process using a conventional cylinder-type forming machine and the wet sheet precured by storing at room temperature. A suitable impregnating resin is then prepared by diluting a B-stage liquid phenol-formaldehyde condensation product (Durez 17670 resin) with water, the resin being mixed with water in the ratio of one part water to one part resin. The dilute resin is then applied to the surface of the precured asbestos-cement sheet in an amount of from 5 to 15 grams of resin per square foot to impregnate the sheet with the resin. The impregnated sheet is then heated to about 250° F. to 280° F. for ½ to 1 hour to cure the resin. The asbestos-cement is then cured in any conventional manner. A conventional finish coating is then applied to the surface of the impregnated, cured sheet, and the finish coated sheet is then dried or heated to cure or coalesce the coating. One suitable finish coating which may be used is a pigmented water-base latex paint such as, for example, a water emulsion of a thermosetting or thermoplastic resin. Other finish coatings which may be applied include pigmented solvent-base acrylic resins, vinyl resins, epoxy resins, and the like.

The phenol-formaldehyde resin in the above preferred embodiment may be replaced by urea-formaldehyde, resorcinol-formaldehyde or melamine formaldehyde resins and applied in the same manner and in the same proportions. The resins are prepared according to methods well known in the art and are selected at the proper stage of cure to be still soluble in alcohol and water dilutable.

While the disclosure has been directed primarily to the treatment of asbestos-cement substrates, it is to be understood that the process of the present invention is also applicable to the treatment of other similar substrates such as, for example, line-silica substrates and asbestos-cement which has been modified by the inclusion of minor amounts of cellulose fiber.

The present invention, as described and illustrated hereinabove and as defined in the appended claims, provides a durable, decorative, weather-resistant asbestos-cement product. Thus, due to the impregnation of the asbestos-cement substrate by the water-diluted resin, the substrate is more cohesive, thereby preventing mechanical movement of the surface particles when the substrate is wetted. Also, this resin layer seals the surface and near surface areas of the substrate against passage of water or water-borne oxides which attack the bonding of the finish coating to the substrate. As a result, finish coatings applied to the asbestos-cement have greater adhesion to the substrate and are accordingly more durable and weather resistant.

It will be understood that various changes in the details, materials, steps, and arrangements which have been herein described and illustrated in order to explain the nature of the invention may be made by those skilled in the art, within the principle and scope of the invention as set forth in the appended claims.

I claim:

1. The process for treating mineral-fiber-containing inorganic-cementitious products to render the substrate of said products more cohesive which comprises impregnating said product with a dilute aqueous solution of a thermosetting formaldehyde resin to provide from about 5–15 grams of dry resin per square foot of said product and heating said resin-impregnated product to cure said resin, thereby forming an integral resin-inorganic-cementitious layer extending from a surface of said product into the interior thereof, without destroying the surface porosity of said inorganic-cementitious product.

2. A process as defined in claim 1 in which said resin is selected from the group consisting of phenol-formaldehyde, urea-formaldehyde, resorcinol-formaldehyde, and melamine-formaldehyde.

3. A process as defined in claim 2 in which said aqueous solution is formed by diluting the resin with water in amounts ranging from one part water to two parts resin, to two parts water to one part resin.

4. A process as defined in claim 2 in which said resin-impregnated product is heated at a temperature of between about 200° F. and 400° F. for a period of time of up to one hour to cure the resin.

5. A process for improving the cohesion of the surface and subsurface areas of mineral-fiber-containing inorganic-cementitious products which comprises applying a dilute aqueous solution of a thermosetting formaldehyde resin to a surface of a sheet of said inorganic-cementitious material to provide from about 5–15 grams of dry resin per square foot of said product, the resin dispersion penetrating said surface and impregnating the subsurface area of said sheet, and heating the resin-impregnated sheet to cure said resin in situ, thereby forming an integral resin-inorganic-cementitious layer extending from said surface of said sheet into the interior thereof, said layer improving the cohesion of the surface and subsurface areas of said sheet, without destroying the surface porosity of said inorganic-cementitious sheet.

6. A process as defined in claim 5 in which said resin is selected from the group consisting of phenol-formaldehyde, urea-formaldehyde, resorcinol-formaldehyde, and melamine-formaldehyde.

7. A process as defined in claim 6 in which the dilute aqueous solution is formed by diluting said resin with water in an amount in the range of from one part water to two parts resin, to two parts water to one part resin.

8. A process for treating mineral-fiber-containing inorganic-cementitious products to improve the integrity of the inorganic-cement which comprises impregnating an inorganic-cementitious sheet with a phenol-formaldehyde resin by applying to a surface of said sheet an aqueous solution of said resin to provide from about 5–15 grams of dry resin per square foot of said product, said resin being diluted with water in the ratio of one part water to one part resin, said resin penetrating the surface of said sheet and impregnating the subsurface area of the sheet, and heating the resin-impregnated sheet at a temperature of between about 250° F. to 280° F. for one half to one hour to cure the resin in situ, thereby forming a resin-inorganic-cementitious layer extending from the surface of the sheet into the interior thereof, without destroying the surface porosity of said inorganic-cementitious sheet.

9. A process for manufacturing a durable, weather-resistant mineral-fiber-containing inorganic-cementitious product having a decorative coating integrally bonded to its surface which comprises forming an aqueous solution of a thermosetting formaldehyde resin by diluting said resin with water, applying said aqueous resin solution to a surface of an inorganic-cementitious sheet to provide from about 5–15 grams of dry resin per square foot of said product, thereby impregnating said sheet with the resin, curing said resin, applying a decorative, weather-resistant finish coating to the surface of said resin-impregnated sheet, and heating said sheet to integrally bond said coating to the surface of the sheet.

10. A process as defined in claim 9 in which said resin is selected from the group consisting of phenol-formaldehyde, urea-formaldehyde, resorcinol-formaldehyde, and melamine-formaldehyde.

11. A process as defined in claim 9 in which said resin is diluted sufficiently with water so that when applied to the surface of said sheet, the resin penetrates the surface of said sheet and impregnates the subsurface area of said sheet.

12. A process as defined in claim 9 in which the resin is diluted with water in amounts ranging from about one part water to two parts resin, to about two parts water to one part resin.

13. A process as defined in claim 9 in which said resin-impregnated sheet is heated at a temperature of between about 200° F. and 400° F. for a period of time of between one half and one hour to cure the resin in situ, thereby binding the surface and subsurface inorganic-cementitious particles to render the inorganic-cementitious substrate more cohesive and preventing mechanical movement of the substrate when the sheet is exposed to water.

14. A durable, decorative, weather-resistant mineral-fiber-containing inorganic-cementitious product comprising a mineral fiber-containing inorganic-cementitious sheet impregnated with a thermosetting formaldehyde resin selected from the group consisting of phenol-formaldehyde, urea-formaldehyde, resorcinol-formaldehyde and melamine-formaldehyde to provide from about 5–15 grams of dry resin per square foot of said product, and a decorative finish coating over and integrally bonded to one surface thereof.

15. The product as defined in claim 14 in which said resin extends from the surface of said sheet into the interior thereof and said decorative coating extends over and is integrally bonded to the resin-impregnated surface.

References Cited

UNITED STATES PATENTS

| 2,035,970 | 3/1936 | MacIldowie | 117—126 |
| 2,716,619 | 8/1955 | Jobbins et al. | 117—72 |
| 3,002,857 | 10/1961 | Stalego | 117—126 |

ALFRED L. LEAVITT, *Primary Examiner.*

H. COHEN, *Assistant Examiner.*

U.S. Cl. X.R.

117—70, 123, 126